United States Patent
Weber

[19]

[11] Patent Number: 6,045,183

[45] Date of Patent: Apr. 4, 2000

[54] CHILD SEAT FOR VEHICLES

[75] Inventor: Norbert Weber, Bondorf, Germany

[73] Assignee: DaimlerChrysler AG, Stuttgart, Germany

[21] Appl. No.: 09/199,576

[22] Filed: Nov. 25, 1998

[30] Foreign Application Priority Data

Nov. 27, 1997 [DE] Germany .......................... 197 52 536

[51] Int. Cl.⁷ .................................................. A47C 1/08
[52] U.S. Cl. ...................... 297/250.1; 297/173; 297/406; 297/487
[58] Field of Search .......................... 297/250.1, 256.15, 297/284.3, 284.9, 284.1, 487, 488, 411.25, 411.23, 397, 399, 400, 423, 118, 135, 173, 181, 217.1, 391, 406, 407, 408, 409, 410; 29/428

[56] References Cited

U.S. PATENT DOCUMENTS

| | | | |
|---|---|---|---|
| 510,282 | 12/1893 | Moody | 297/411.23 X |
| 1,238,782 | 9/1917 | Kaye | 297/399 X |
| 1,292,200 | 1/1919 | Williams | 297/256.15 X |
| 4,161,337 | 7/1979 | Ross et al. | 297/284.9 X |
| 4,946,180 | 8/1990 | Baer | 297/488 X |
| 5,207,481 | 5/1993 | Ayala, Jr. et al. | 297/423.4 X |
| 5,294,172 | 3/1994 | Dubus | 297/148 |
| 5,382,074 | 1/1995 | Pietra | 297/487 X |
| 5,447,356 | 9/1995 | Snijders | 297/284.3 |
| 5,581,234 | 12/1996 | Emery et al. | 297/250.1 X |
| 5,636,900 | 6/1997 | Wilkie et al. | 297/284.3 X |
| 5,810,436 | 9/1998 | Surot | 297/284.9 X |

FOREIGN PATENT DOCUMENTS 37 03 742  8/1988  Germany .

Primary Examiner—Milton Nelson, Jr.
Attorney, Agent, or Firm—Evenson McKeown Edwards & Lenahan PLLC

[57] ABSTRACT

A child seat for vehicles, particularly for passenger cars, having a seat bucket which has a seat surface, a back support and two side parts which laterally bound this back support. For improving such a child seat such that new function areas are opened up for the child, guide rails are in each case arranged on the upper edge of the two lateral parts and, in each guide rail, a structural part projecting upwards on the side part is displaceably accommodated by way of a guiding foot. The two structural parts are constructed such that they are capable of forming support cheeks in a displacement position situated in the head area of the seat bucket, and the guiding feet can be locked at least in the displacement position situated in the head area and in a displacement position situated in the leg area, in which case the structural parts can be used in the latter displacement position for forming a table surface.

17 Claims, 4 Drawing Sheets

6,045,183

CHILD SEAT FOR VEHICLES

BACKGROUND AND SUMMARY OF THE INVENTION

This application claims the priority of German application 197 52 536.9-16, filed in Germany on Nov. 27, 1997, the disclosure of which is expressly incorporated by reference herein.

The invention relates to a child seat for vehicles, particularly for passenger cars.

In a child seat of this type known from German Patent Document DE 37 03 742 C2, a safety bow spans the seat bucket in the leg area of the seat bucket accommodating the child and restrains the child in the seat bucket in the event of a crash. In addition, this safety bow may be shaped such that a table area is offered to the child for playing and depositing toys. In the head area of the seat bucket, support cheeks are formed in the two side parts which protect the child's head against an extreme lateral displacement.

It is an object of the invention to improve a child seat of the type mentioned above such that new operating areas are opened up for the child.

According to the invention, this object has been achieved by providing a child seat for a vehicle, comprising a seat bucket having a leg support area, a back support area, two side parts laterally bounding said back support area, and a head support area; a guide rail arranged on an upper edge of each of said side parts; at least one structural part being selectively engageable with said guide rail via at least one guide foot at a plurality of positions along said guide rail including a head support position proximate said head support area and a leg area position proximate said leg support area.

According to the invention, this object has been achieved by providing a multi-functional system for a motor vehicle child seat having a seat bucket having a leg support area, a back support area, two side parts laterally bounding said back support area, and a head support area, said multi-functional system comprising a guide rail arranged on an upper edge of each of said side parts; at least one structural part being selectively engageable with said guide rail via at least one guide foot at a plurality of positions along said guide rail including a head support position proximate said head support area and a leg area position proximate said leg support area.

According to the invention, this object has been achieved by providing a method of making a multi-functional system for a motor vehicle child seat having a seat bucket having a leg support area, a back support area, two side parts laterally bounding said back support area, and a head support area, said method comprising arranging a guide rail on an upper edge of each of said side parts; providing at least one structural part which is selectively engageable with said guide rail via at least one guide foot at a plurality of positions along said guide rail including a head support position proximate said head support area and a leg area position proximate said leg support area.

The child seat according to the invention has the advantage of a highly flexible system which changes the child seat into an "adventure seat" for the child. The constructive expenditures are relatively low and comprise the seat bucket as the "basic support", the structural parts as well as the mechanism for the detent on the vehicle rails and the joints for the different movements of the structural parts. The child seat according to the invention may be used as a pure safety seat, in the case of which the child's head is supported by cheeks, and as a play or activity seat, in several variations. The structural parts will then act directly as a table area or as a basic support for additional attachments of many different types, such as a play table, etc.

Other objects, advantages and novel features of the present invention will become apparent from the following detailed description of the invention when considered in conjunction with the accompanying drawings.

DETAILED DESCRIPTION OF THE DRAWINGS

Figure 1:
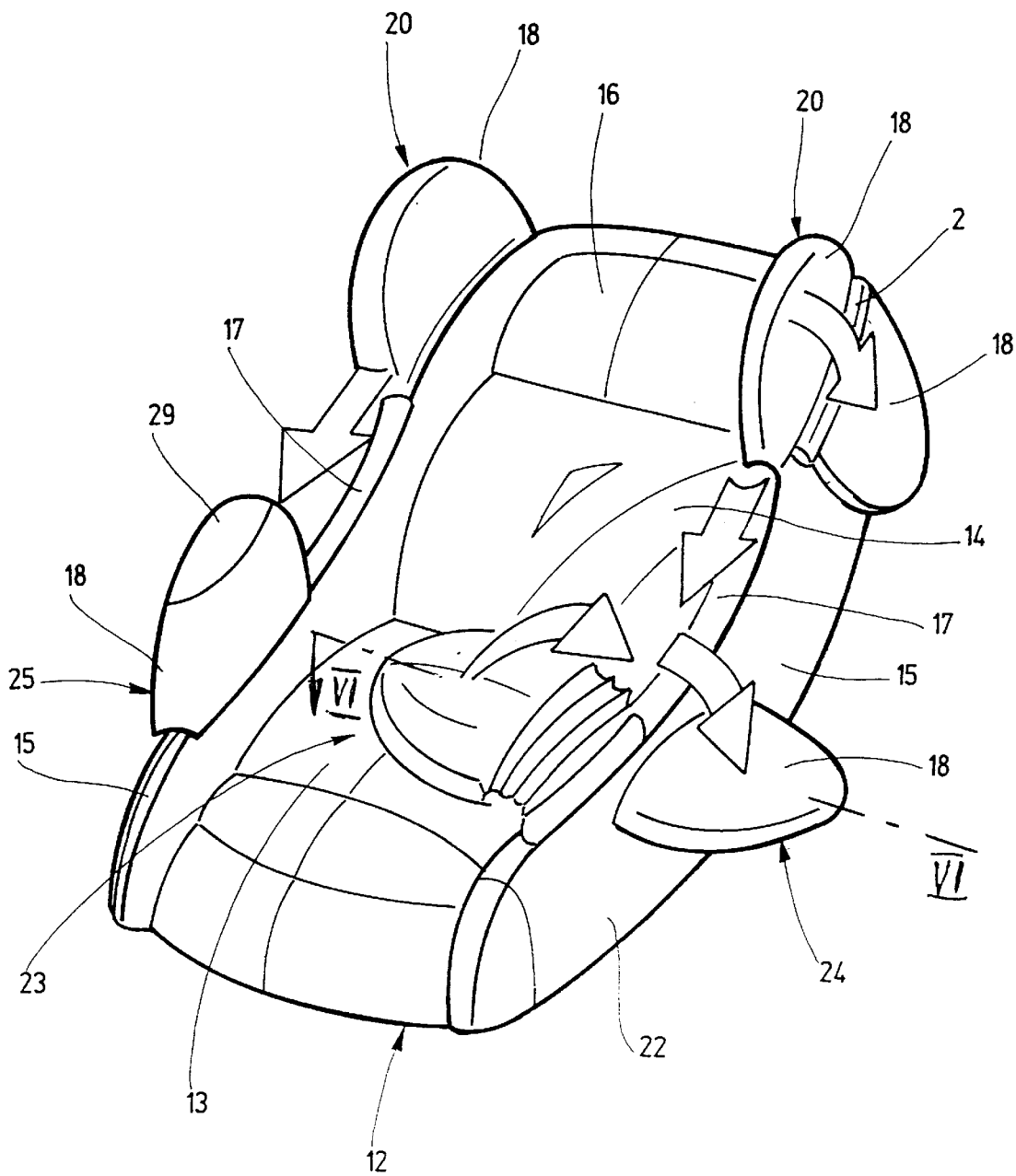
FIG. 1 is a perspective view of a child seat for a passenger car with all modification variants, according to a preferred embodiment of the present invention.

The child seat for a passenger car illustrated perspectively in FIG. 1 is fastened on the rear seat bench of a passenger car and, for this purpose, has two laterally arranged fastening rods 11 (FIGS. 2–5) which are fitted through between the seat cushion and the backrest cushion of the rear seat bench and are locked to the vehicle frame or to the vehicle body via corresponding locking devices. The child seat has a seat bucket 12 with a seat surface (or leg support area) 13, a back support area 14 and two side parts 15 which laterally bound the back support 14 and project beyond the seat surface 13 and the back support 14. The seat bucket 12 is cushioned on the inside, a head cushion (or head support area) 16 being shaped out on the upper end of the back support 14.

Figure 6:
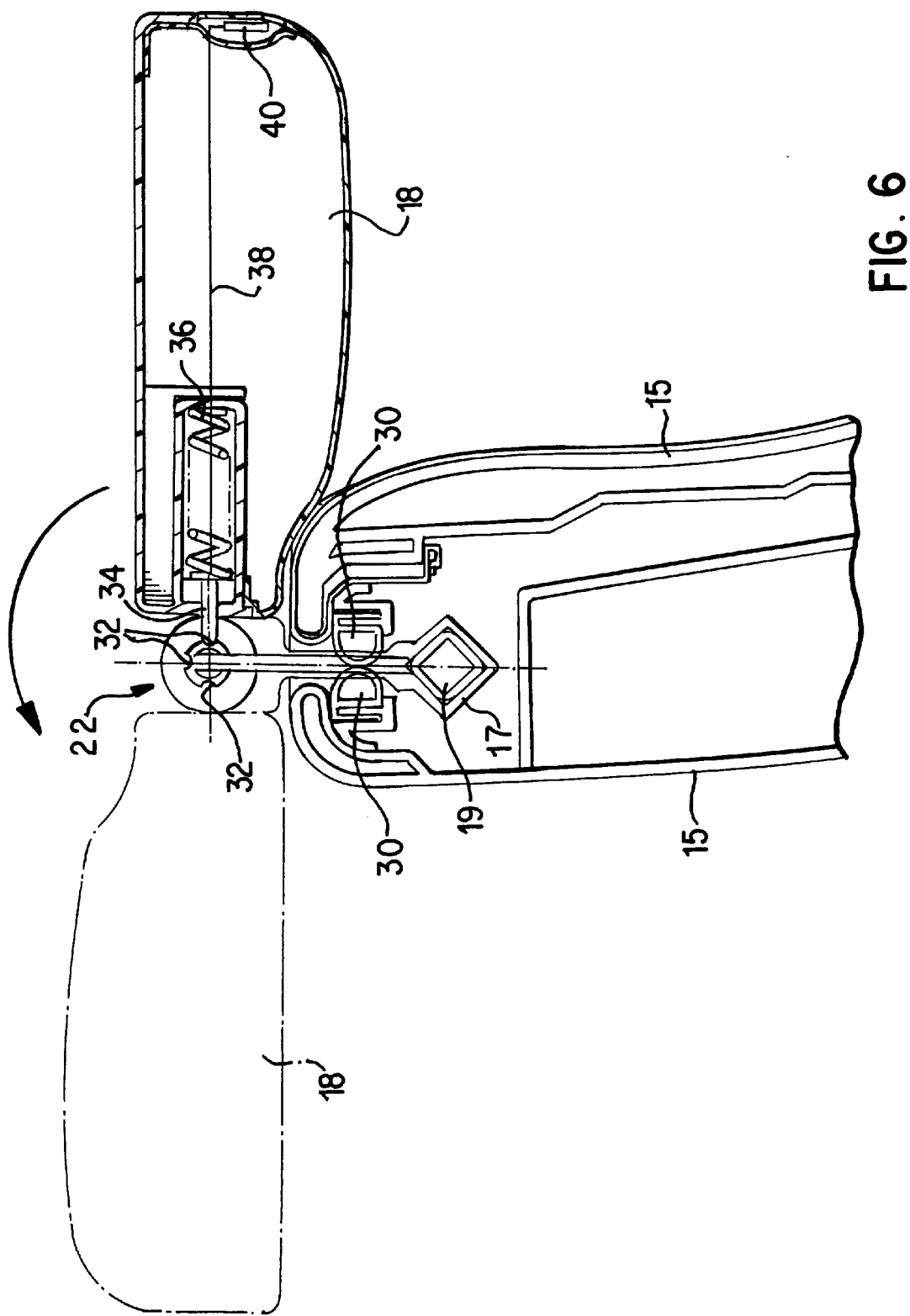
FIG. 6 is a cross-sectional view taken along line VI—VI of FIG. 1, showing the structure of the swivel connection.

A guide rail or track 17 extends along the upper edge of each the two side parts 15. As shown in FIG. 6, the guide rail 17 defines an opening for receiving a guiding foot 19 of a structural part 18. The guide track 17 and the guiding foot 19 may be configured such that the guiding foot 19 is engageable with (e.g., slidable onto) the guide track 17 only at a specific position, for example at a lower end and/or an upper end of the track. Seals 30 are disposed along opposite lateral sides of the guide track 17. The seals 30 frictionally engage a portion of the guiding foot 19 to provide a supporting and/or locking function for the structural part 18.

In an alternative embodiment, at least one of the seals 30 and the guiding foot 19 are made of an elastic material, such that the guiding foot 19 can be engaged with and disengaged from the guide track 17 by pressing the guiding foot 19 between the seals 30, i.e., along the vertical axis shown in FIG. 6.

Figure 2:
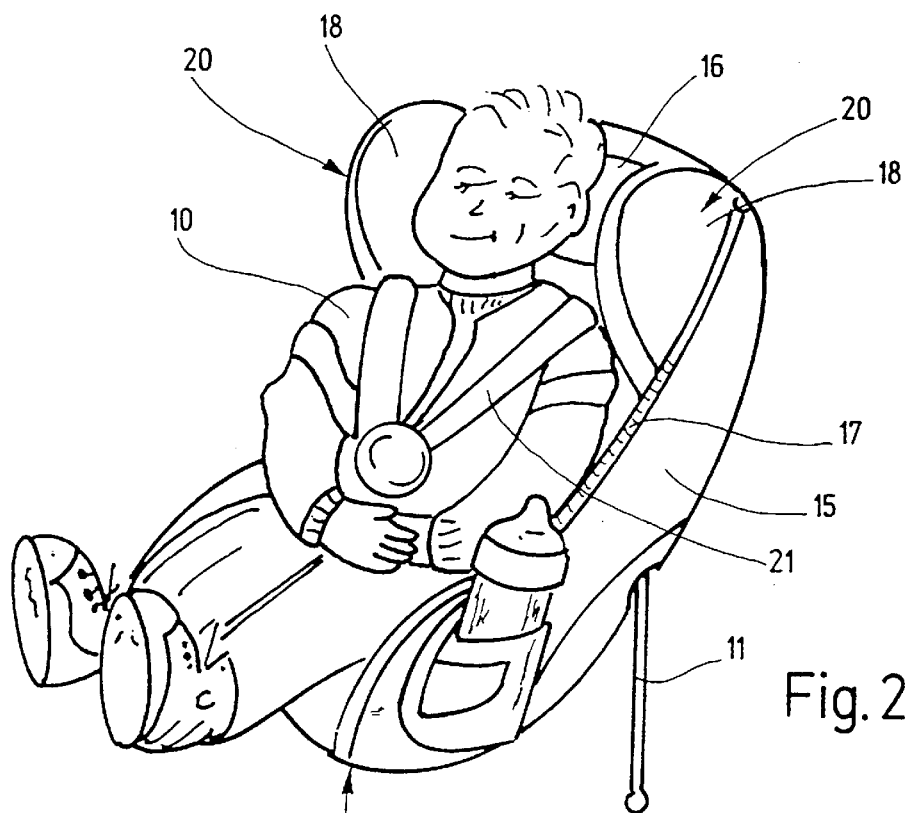
FIG. 2 is a perspective view of the child seat of FIG. 1 with the structural parts positioned as lateral support cheeks proximate the head of a child seated therein.

The structural parts 18 are constructed such that when positioned proximate the head of the child 10 sitting in the seat bucket 12 as shown in FIG. 2, they form support cheeks 20 for the supporting the child's head. The child 10 is also secured in the seat bucket 12 by a suspender-type belt 21. A swivel connection 22 is provided between the guiding foot 19 and the structural part 18, which allows a swivelling of the structural part 18 relative to the guiding foot 19 in a swivelling direction extending transversely to the guide rail 17. These swivel connections 22 allow the structural parts 18 to be swivelled, for example, away to the outside in their displacement position in the head area, for example if the support cheeks 20 formed by the structural parts 18 are disturbing to the child (compare FIG. 1).

The swivel connection 22 between the structural part 18 and the guiding foot 19 can be locked in certain swivelling positions so that an unintentional changing of the swivel position is prevented. In the support cheek function of the structural parts 18 (FIG. 2), the swivel connection 22 is locked in a 0°-position so that the support cheeks 20 cannot be pressed to the outside by the child 10. The detent of the swivel connection 22 can be constructed in various manners, as would recognized by those skilled in the art. Locking devices are arranged on the guiding feet 19, by way of which locking devices each guiding foot 19 can be locked in various displacement positions in the guide rail 17. Like the detent devices, these locking devices can also be operated manually, that is, can be released and/or activated manually.

According to the embodiment shown in FIG. 6, the swivel connection 22 includes a plurality of detents 32. A pin 34 located in a recess of the structural part 18 is selectively engageable with the detents 32. The pin 34 is biased outwardly from the recess by a spring 36 located in the recess, and is manually disengageable from the detent 32 via a cable 38 and ring 40.

Figure 3:
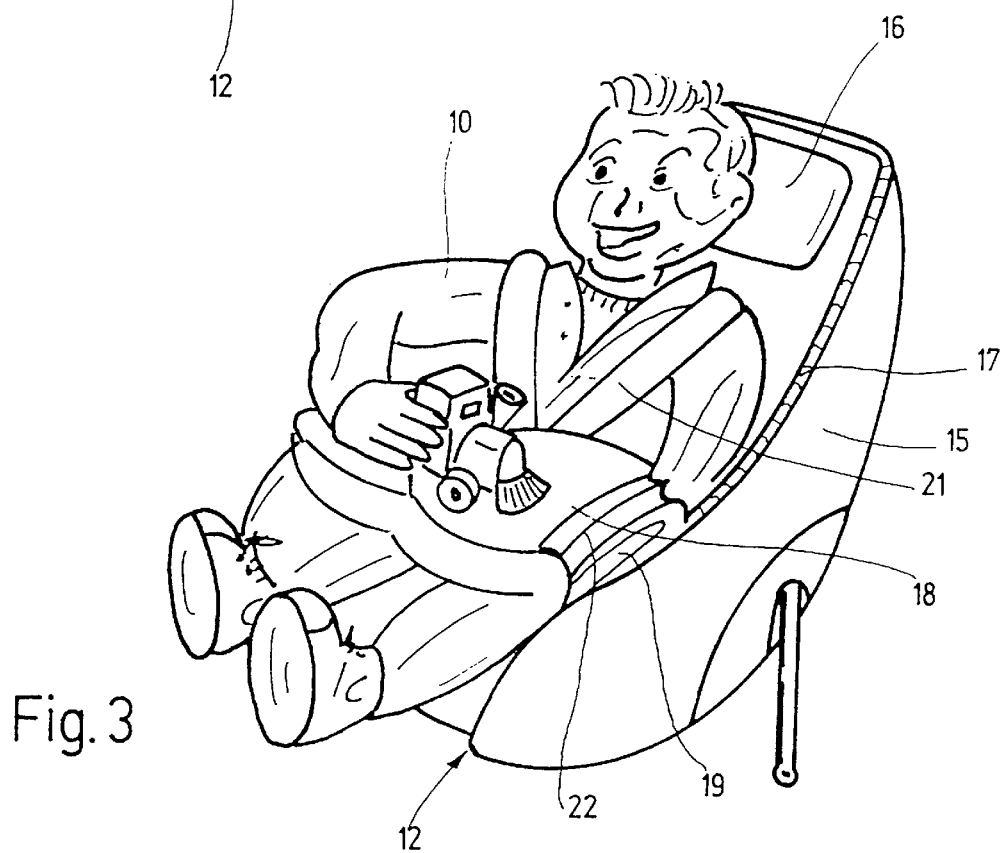
FIG. 3 is a perspective view of the child seat of FIG. 1 with the structural parts positioned as a table in front of the child.
Figure 4:
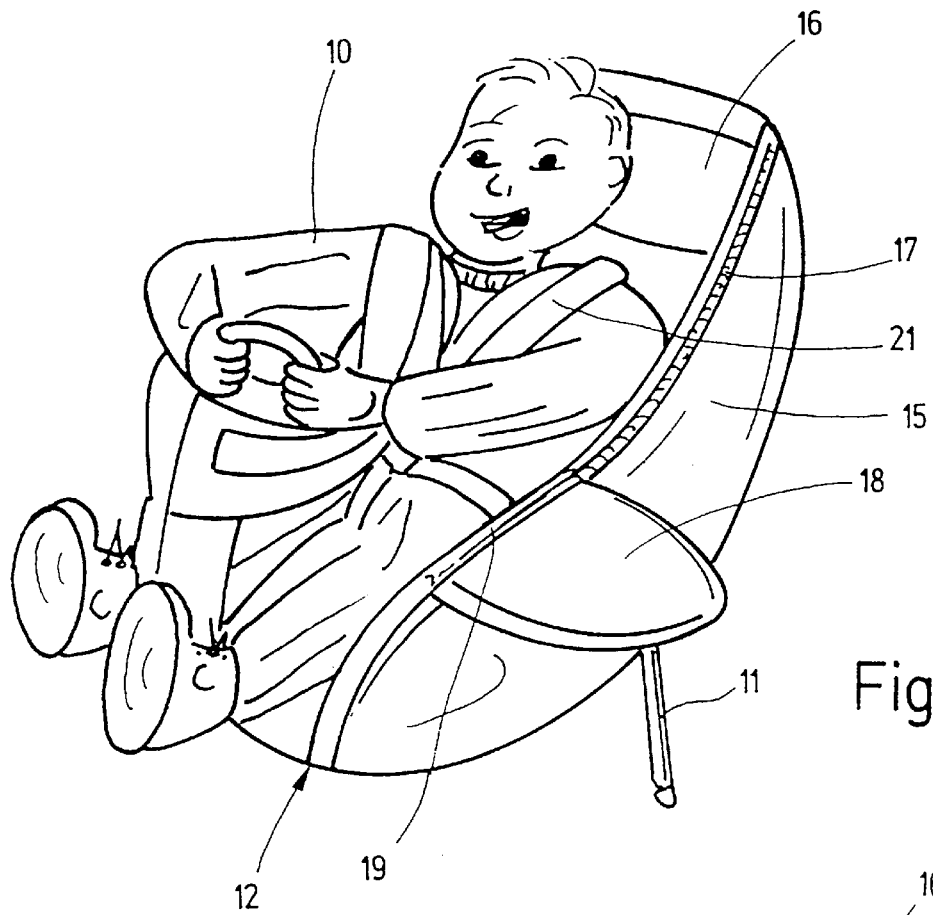
FIG. 4 is a perspective view of the child seat of FIG. 1 with a structural part positioned as a table extending laterally outwardly from the seat.
Figure 5:
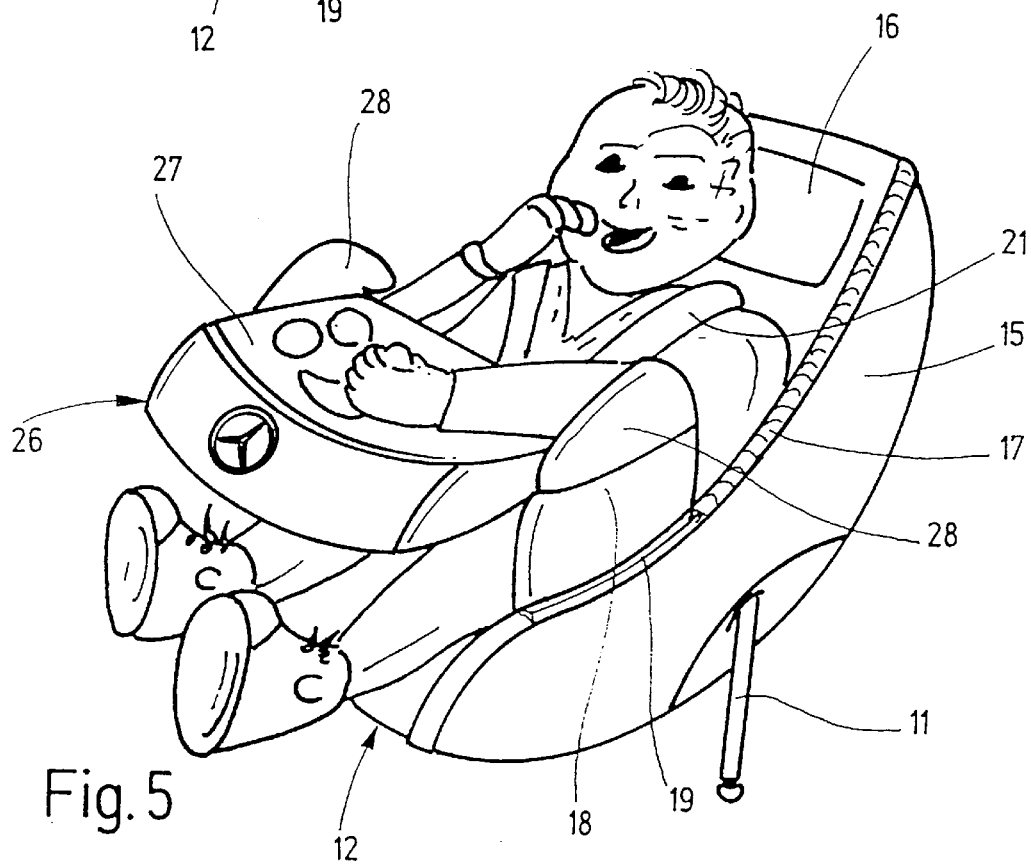
FIG. 5 is a perspective view of the child seat of FIG. 1 with the structural parts positioned to form supports for receiving an attachment.

After the release of the guiding foot locks, the two structural parts 18 can be displaced in the guide rails 17 and can be locked again in a displacement position situated in the leg area. This displacement position of the structural parts 18 in the leg area is illustrated in FIGS. 3 to 5 and is also entered in FIG. 1. As the result of the swivel connections 22 between each structural part 18 and the guiding foot 19, the two structural parts 18 can be swivelled in this displacement position by 90° into the interior of the seat bucket 12, where the two structural parts 18 form a table 23 which extends transversely over the leg area (FIG. 3). This table 23 can be used by the child 10 as a play surface or as a depositing surface for toys. As the result of the swivel connection 22, the two structural parts 18 can also be swivelled by 90° to the outside and, after being locked, can be used here as small depositing table areas 24 (FIG. 4).

In their displacement position locked in the leg area, the structural parts 18 can be used as two laterally ascensional basic supports 25 for attachments 26 which offer play and diversion possibilities for the child 10 and are suspended between the basic supports 25. A table top, a rattle, a music box, skill games, or the like, can, for example, be provided as attachments 26. In the embodiment of FIG. 5, the attachment is a play table 27 which is fitted by means of two suspension ears 28 into plug-in receiving devices of the two structural parts 18, which exist in the upper edges of the two structural parts 18 facing away from the guiding feet 19. For exposing the plug-in receiving devices,—as illustrated in FIG. 1—an upper cap 29 must be removed from the structural part 18. In its attached position, this cap 29 is integrated in the outer contour of the structural part 18 and forms a portion of the structural part 18.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A child seat for a vehicle, comprising:
    a seat bucket having a leg support area, a back support area, two side parts laterally bounding said back support area, and a head support area;
    a guide rail extending along an upper edge of each of said side parts between said leg support area and said head support area;
    at least one structural part having at least one guide foot which is selectively engageable with one of the guide rails at a plurality of positions along said one of the guide rails including a head support position proximate said head support area and a leg area position proximate said leg support area.

2. A child seat according to claim 1, wherein said at least one structural part is formed as a support cheek such that said structural part acts as a lateral head support when in said head support position.

3. A child seat according to claim 1, further comprising means for locking said at least one guide foot to said guide rail when said at least one structural part is in said head support position and when said at least one structural part is in said leg area position.

4. A child seat according to claim 1, further comprising a suspender type belt coupled to the seat bucket for securing a child in the seat bucket.

5. A child seat according to claim 1, wherein said guide rail defines an opening for receiving said guide foot.

6. A child seat according to claim 1, wherein said at least one structural part is constructed to form a depositing surface when in said leg area position.

7. A child seat according to claim 6, wherein said at least one structural part is constructed to form a lateral support for an attachment part when in said leg area position.

8. A child seat according to claim 7, wherein said attachment part is one of a play table, an activity table, and a diversion game.

9. A child seat according to claim 1, wherein a swivel connection is provided between said at least one structural part and said guide foot, such that said at least one structural part can be swivelled about a longitudinal axis of the guide rail.

10. A child seat according to claim 9, wherein said swivel connection includes means for locking said at least one structural part in a substantially vertical plane and in a substantially horizontal plane.

11. A child seat according to claim 10, wherein said swivel connection is constructed such that when said at least one structural part is in the leg area position said structural part can be swivelled from said substantially vertical plane 90° toward the exterior of the seat bucket into said substantially horizontal plane such that said at least one structural part forms a depositing table situated outside the seat bucket.

12. A child seat according to claim 10, wherein said at least one structural part comprises two of said structural parts arranged on said guide rails, respectively, and wherein said swivel connection is constructed such that when said structural parts are in the leg area position each of said structural parts can be swivelled from said substantially vertical plane 90° toward the interior of the seat bucket into said substantially horizontal plane such that said two structural parts form a table which transversely covers the leg support area of the seat bucket.

13. A child seat according to claim 12, wherein said swivel connection is constructed such that when said structural parts are in the leg area position either of said structural parts can be swivelled from said substantially vertical plane 900 toward the exterior of the seat bucket into said substantially horizontal plane such that said structural part forms a depositing table situated outside the seat bucket.

14. A method of making a multi-functional system for a motor vehicle child seat having a seat bucket having a leg support area, a back support area, two side parts laterally bounding said back support area, and a head support area, said method comprising:

forming a guide rail on an upper edge of each of said side parts extending between said leg support area and said head support area;

providing at least one structural part having at least one guide foot which is selectively engageable with one of the guide rails at a plurality of positions along said one of the guide rails including a head support position proximate said head support area and a leg area position proximate said leg support area.

15. A method according to claim 14, wherein said guide rail defines an opening for receiving said guide foot.

16. A multi-functional system for a motor vehicle child seat having a seat bucket having a leg support area, a back support area, two side parts laterally bounding said back support area, and a head support area, said multi-functional system comprising:

a guide rail extending along an upper edge of each of said side parts between said leg support area and said head support area;

at least one structural part having at least one guide foot which is selectively engageable with one of the guide rails at a plurality of positions along said one of the guide rails including a head support position proximate said head support area and a leg area position proximate said leg support area.

17. A system according to claim 16, wherein said guide rail defines an opening for receiving said guide foot.

\* \* \* \* \*